United States Patent [19]

Lamb

[11] 3,997,015
[45] Dec. 14, 1976

[54] TEST WEIGHT

[75] Inventor: Bernard M. Lamb, St. Paul, Minn.

[73] Assignee: Allied Weight System Inc., St. Paul, Minn.

[22] Filed: May 27, 1975

[21] Appl. No.: 580,606

[52] U.S. Cl. .................................. 177/264; 73/1 B
[51] Int. Cl.² ...................................... G01G 21/26
[58] Field of Search ............... 73/1 B; 177/264, 50; 114/16 E, 121, 40

[56] References Cited
UNITED STATES PATENTS

| | | | |
|---|---|---|---|
| 70,531 | 11/1867 | Comstock | 177/264 |
| 1,094,895 | 4/1914 | Hazen | 177/264 |
| 1,532,136 | 4/1925 | Gray | 177/264 |
| 1,811,831 | 6/1931 | King | 177/264 X |
| 1,869,425 | 8/1932 | Hurt | 177/264 X |
| 1,878,009 | 9/1932 | Snelling | 177/264 |
| 2,699,329 | 1/1955 | Bean | 73/1 B X |

*Primary Examiner*—Richard C. Queisser
*Assistant Examiner*—Daniel M. Yasich
*Attorney, Agent, or Firm*—Orrin M. Haugen

[57] ABSTRACT

A field standard test weight having a density of between 7 and 9 grams per cubic centimeter and including a steel shell forming a durable enclosure, with the shell being filled with a mixture of lead slag, metallic lead, and lead oxide to achieve the overall density required, with various configurations being made possible because of the overall design characteristics. The test weight may also be provided with a weight adjusting cavity for receiving a charge of metallic lead therewithin in order to achieve the tolerances required for field standard test weights.

2 Claims, 4 Drawing Figures

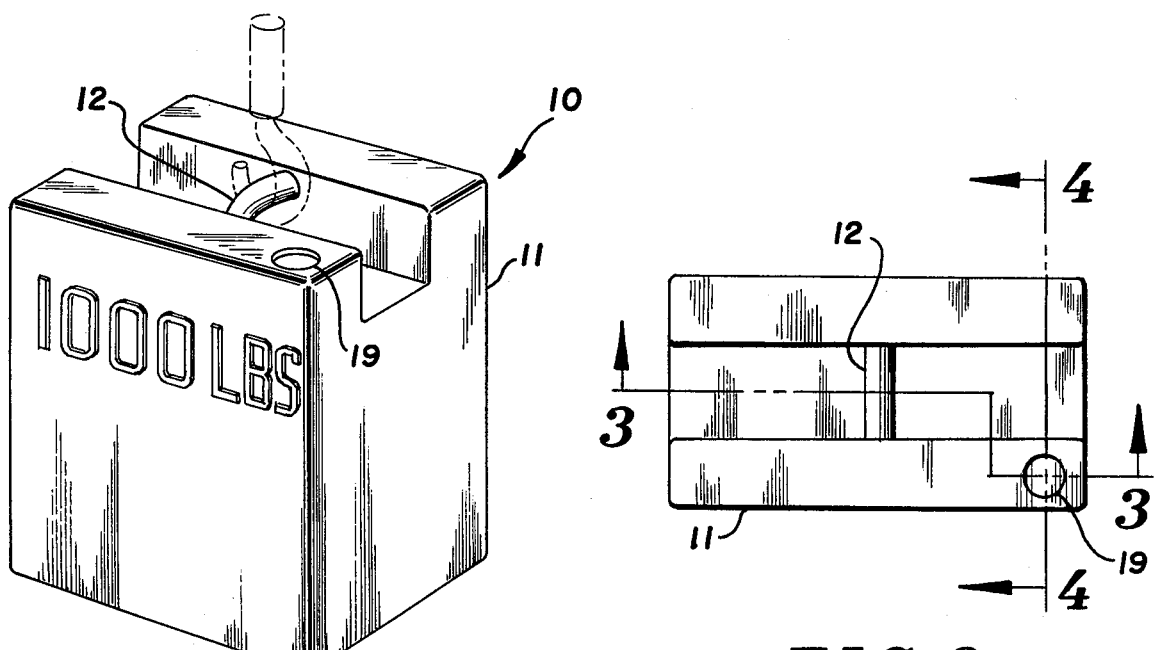
*FIG. 1*
*FIG. 2*
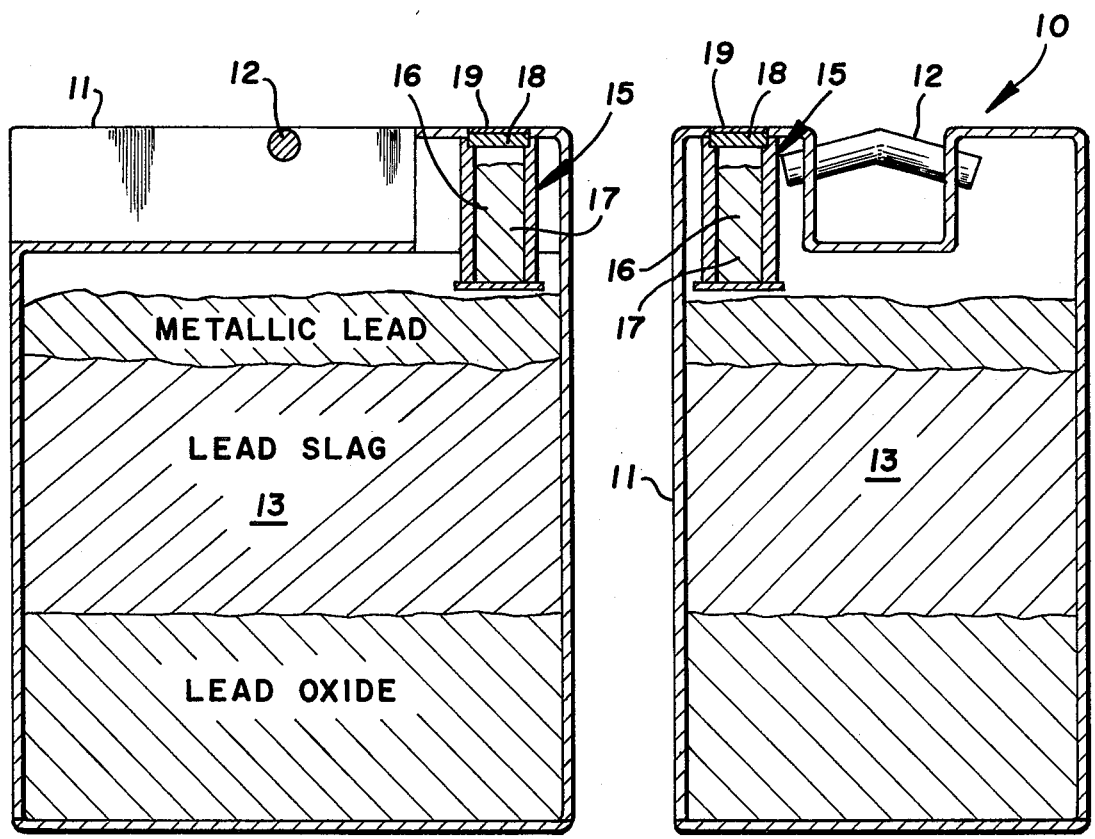
*FIG. 3*
*FIG. 4*

TEST WEIGHT

BACKGROUND OF THE INVENTION

The present invention relates generally to an improved field standard test weight, and more particularly to such a test weight utilizing a steel shell with a filling comprising a mixture of lead slag, metallic lead, and lead oxide. The individual components forming the fill are, of course, adjusted in accordance with established standards in order to achieve the required density of between 7 and 9 grams per cubic centimeter. For portability of the weight, it is desirable that the height be controlled within established limits.

In the past, test weights greater than 50 lbs., for example, have traditionally been made from a solid piece of cast iron. Traditional casting techniques normally provide a rejection rate of about 30 percent, the rejections being based upon the generation of blow-holes in the casting, thus contributing to under-weight units in the production. Because of the durability, cast iron had, in the past, been the accepted standard, particularly for those weights of 500 lbs. and above. For example, test weights of 1000 lbs. had a common and well-known size, that is, a solid having dimensions of 15½inches × 19½inches × 20 inches high.

For the traditional techniques of applying weight standards to commercial scales and the like, it has been common practice to utilize a plurality or group of 50 lb. test weights. These test weights are required for the calibration of certain commercial installations, and for continued administrative approval by various State, Federal and local agencies. The specifications and tolerances for field standard test weights are set forth in a publication by the National Bureau of Standards entitled "Specifications and Tolerances for Reference Standards and Field Standard Weights and Measures, (1) Specifications and Tolerances for Field Standard Weights (NBS Class F)", the publication being known as NBS Handbook 105-1, Revised 1972. This publication is available from the U.S. Department of Commerce, Superintendent of Documents, U.S. Government Printing Office, SD Catalog No. C 13.11:105-1. The publication is authored by Thomas M. Stabler of the Office of Weights and Measures, Institute for Applied Technology, National Bureau of Standards.

Typically, field standard test weights are constructed of materials such as steel or stainless steel having a hardness of Vickers 220 or greater, and are resistant to abrasion, denting and chipping. While cast iron is qualifying material, particularly for weights 20 lbs. and larger, production of such weights generates a significant number of rejects when the size becomes greater than 50 lbs., and particularly in sizes greater than 500 lbs. The density requirements for such field standard weights is between 7 and 9 grams per cubic centimeter.

While no particular form is required for the test weights, it has been determined that experienced personnel will utilize and recognize standard weights by size and configuration. Therefore, in order to reduce the likelihood of confusion, a standard form and size should preferably be retained, such as that set forth hereinabove for weights of 1000 lbs., for example. A standard configuration is also desired for reducing the likelihood of confusion, and also for aiding in portability, when desired.

In order to achieve a weight adjustment so as to render the test weight consistent with the tolerance level of one part in 10,000, a weight adjusting cavity is provided. In the present structure, such a weight adjusting cavity may be provided for receiving a fill of metallic lead, the density of the lead being sufficiently high so as to achieve an overall density of between 7 and 9 grams per cubic centimeter in the overall test weight.

SUMMARY OF THE INVENTION

Therefore, in accordance with the present invention, an improved field standard test weight is provided which comprises a steel shell forming a durable enclosure, and with the shell receiving a fill of a mixture of lead slag, lead oxide, and metallic lead. These fill materials are commonly available, and, for a substantial part, comprise waste materials which are now being utilized simply for waste purposes. Therefore, these materials may be employed for a useful purpose, and with the field standard test weight being provided which meets the established requirements of the U.S. Department of Commerce through the National Bureau of Standards. In a typical field standard test weight prepared in accordance with the present invention, a 1000 lb. test weight is provided having an exterior dimension of 15½ inches × 19½ inches × 20 inches high, with the steel shell provided having a weight of 225 lbs., the balance comprising 500 lbs. lead slag, 200 lbs. lead oxide, the balance of 75 lbs. being metallic lead. The reject rate of such structures, of course, is exceptionally low and the durability is consistent with that of solid cast iron units. It is appropriate that these structures retain the configuration of the established solid cast iron units in order to provide for interchangeability when necessary.

Therefore, it is a primary object of the present invention to provide an improved field standard test weight which comprises a steel shell forming an enclosure for receiving a fill of lead slag, lead oxide, and metallic lead, the overall density of the test weight being between 7 and 9 grams per cubic centimeter.

It is a further object of the present invention to provide an improved field standard test weight which may be employed in lieu of solid cast iron test weights, and which may be fabricated in any of the standard sizes, for example, from 50 lbs. and above.

Other and further objects of the present invention will become apparent to those skilled in the art upon a study of the following specification, appended claims, and accompanying drawing.

BRIEF DESCRIPTION OF THE DRAWING

FIG. 1 is a perspective view of a typical test weight prepared pursuant to the present invention, and illustrating, in phantom, a typical supporting hook for utilization during a testing procedure with the test weight;

FIG. 2 is a top plan view of the test weight illustrated in FIG. 1; and

FIGS. 3 and 4 are vertical sectional views taken along the line and in the direction of the arrows 3—3 and 4—4 respectively of FIG. 2.

DESCRIPTION OF THE PREFERRED EMBODIMENT

In accordance with FIG. 2 of the embodiment of the present invention, and with particular attention being directed to the drawing, the test weight generally designated 10 comprises a steel shell means or the like 11 forming a durable enclosure for the structure. The steel sheel means 11 comprises walls which enclose a certain predetermined volume therewith, such as is illustrated in FIGS. 3 and 4. The walls, for example, are ¼ inch in thickness for a 1000 lb. test weight having external dimensions, as indicated, 15½ inches × 19½ inches ×20 inches high. Normally, the shell means will be in the form of a top enclosure to which is welded a bottom plate for completing the enclosure.

In order to receive a hook or other lifting or supporting member, a rod such as the rod 12 is provided, as indicated.

The material forming the fill, such as the fill generally designated 13 is preferably formed of the following:
 50% lead slag
 20% lead oxide
 7.5% metallic lead
For most field standard test weights, this mixture will comprise 77.5% of the overall weight, with the balance being achieved from the steel shell. Obviously, for certain test weight designs, the fill may be varied to achieve desired results.

In order to achieve fine weight adjusting calibration, a weight adjusting cavity generally designated 15 is provided, with the interior of the cavity, as at 16, being arranged to receive a fill of metallic lead as at 17. The lead charge 17 is retained in place by steel plug 18 which is in turn retained in place by lead seal member 19.

For most purposes, the interior confines of the shell 11 will be sufficient to receive an adequate charge of fill material as indicated at 13. The structure and general configuration is appropriate, for example, for test weights in excess of about 50 lbs.

Because of the traditional requirements for handling test weights, the structures of the present invention have been found to be usable for weights up to about 2500 lbs., although there is no absolute limit on size. The 2500 lbs. is established as a practical limit for handling purposes.

The materials for providing the fill are achieved from various waste products, at least in part. Lead slag and lead oxide are frequently available as a residue from storage battery processing and other metallurgical techniques. The slag is in solid mass form, for example, one-inch chunks, with the oxide being available in granular form as is traditional. Metallic lead is readily available commercially.

As will be appreciated, the various edges of the enclosure 11 are welded and ground smooth in order to achieve a durable enclosure. The lead slag and lead oxide materials have a density of approximately 5 grams per cubic centimeter, thus providing the ratio of components required in order to achieve the overall density requirements in the finsihed product.

The lead slag and lead oxide materials are useful because of their non-hygroscopic characteristic. Thus, the material will not be susceptible to weight-change because of environmental conditions.

The cavity 15 is one which, for a 1000 lb. test weight, will have a 2 inch diameter with a 5 inch depth. This volume will provide a convenient capacity for approximately 7.2 lbs. of metallic lead, thus achieving the weight adjusting characteristic required for devices of this type.

I claim:

1. Test weight standard means for scale weight calibration purposes having a density of between 7 and 9 grams per cubic centimeter and including:
 a. steel shell means forming a durable enclosure, with said shell means comprising walls enclosing a certain predetermined volume therewithin said enclosure including lifting means;
 b. said predetermined volume containing a fill of a mixture of lead slag, lead oxide, and metallic lead, with the test weight containing the following weight contributing components:

| Component | Percent by Weight |
|---|---|
| Lead slag | 50% |
| Lead oxide | 20% |
| Metallic lead | 7.5% |
| Steel shell | 22.5% |

2. The test weight standard means as defined in claim 1 being particularly characterized in that said enclosure contains a weight adjusting cavity for receiving a charge of metallic lead therewithin.

* * * * *